(12) United States Patent
Koehler et al.

(10) Patent No.: US 7,804,189 B2
(45) Date of Patent: Sep. 28, 2010

(54) EFFICIENT DC DISTRIBUTION SYSTEM, TOPOLOGY, AND METHODS

(75) Inventors: Bill Koehler, Saylorsburg, PA (US); Donald Mulvey, Stroudsburg, PA (US)

(73) Assignee: Roal Electronics, SpA, Castelfidardo (IT)

( * ) Notice: Subject to any disclaimer, the term of this patent is extended or adjusted under 35 U.S.C. 154(b) by 415 days.

(21) Appl. No.: 11/777,646

(22) Filed: Jul. 13, 2007

(65) Prior Publication Data

US 2009/0015067 A1    Jan. 15, 2009

(51) Int. Cl.
*H02J 3/14*    (2006.01)
(52) U.S. Cl. ........................................................ 307/31

(58) Field of Classification Search .................... 307/31, 307/11; 315/141
See application file for complete search history.

(56) References Cited

U.S. PATENT DOCUMENTS

| 5,781,000 | A  | * | 7/1998  | Saeki et al. ................. 323/234 |
| 7,230,813 | B1 |   | 6/2007  | Canova |
| 7,459,866 | B2 | * | 12/2008 | Yu et al. ..................... 315/291 |
| 7,466,042 | B2 | * | 12/2008 | Eldredge .................... 307/154 |
| 2005/0078024 | A1 | | 4/2005 | Harrington |

* cited by examiner

*Primary Examiner*—Michael Rutland Wallis
(74) *Attorney, Agent, or Firm*—Merle W Richman, Esq.

(57) ABSTRACT

Embodiments of power distribution systems and methods are described generally herein. Other embodiments may be described and claimed.

22 Claims, 6 Drawing Sheets

EFFICIENT DC DISTRIBUTION SYSTEM, TOPOLOGY, AND METHODS

TECHNICAL FIELD

Various embodiments described herein relate to low voltage direct current (DC) devices supplied by high voltage direct current source and AC power source.

BACKGROUND INFORMATION

Figure 1:
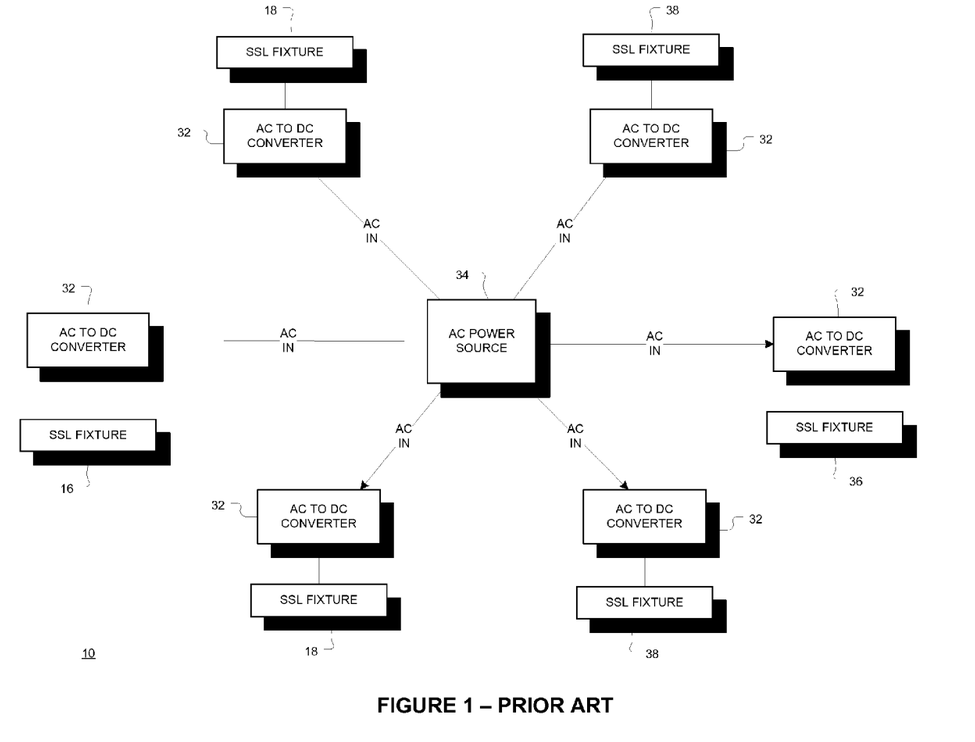
FIG. 1 is a block diagram of a prior art power distribution architecture.

FIG. 1 is a block diagram of prior art architecture 10 that includes several DC power based solid state lighting (SSL) fixtures 16, 18, 36, 38. In this architecture 10, each SSL fixture 16, 18, 36, 38 includes or is coupled to a power converter 32. Each power converter 32 may be coupled to an alternating current (AC) power supply and may convert the AC signal or power to a DC signal having the signal requirements for a corresponding SSL fixture 16, 18, 36, 38. The architecture 10 may require a qualified electrician to connect an AC signal to each AC to DC converter 32. The AC to DC converter 32 may be located in close proximity to each fixture 16, 18, 36, 38, e.g., within the same room or less than a predetermined maximum distance from a fixture. The present invention provides a more efficient system, topology, and method for supplying DC power to two or more DC power based devices versus requiring a power converter 32 for each fixture 16, 18, 36, 38.

DETAILED DESCRIPTION

Figure 2A:
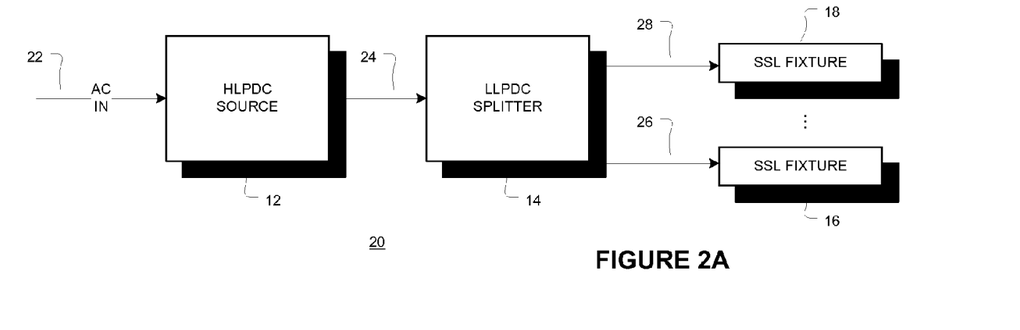
FIG. 2A is a block diagram of a power distribution architecture according to various embodiments.

FIG. 2A is a block diagram of a power distribution architecture 20 according to various embodiments. The architecture 20 includes a higher-limited-power DC (HLPDC) source 12, a lower-limited-power DC (LLPDC) splitter 14, and two or more DC powered devices 16, 18. In an embodiment the DC powered device may be a solid state lighting (SSL) fixture including a Light Emitting Diode (LED), electro-luminance (EL), or other low voltage DC lighting device. An LED fixture may include a LED lighting strip, lighting tile, lighting unit, module, array, channel letter sign kit, channel light, border light kit, channel letter lighting system, border tube kit, Class 2 lighting system, Class 2 lighting assembly, Class 2 lighting strip, Class 2 illumination module, or Class 2 fixture.

In an embodiment the HLPDC source 12 is an alternating current (AC) to DC converter. The HLPDC source 12 may receive an AC signal 22 and generate a constant DC current-limited, a constant voltage-limited signal, or a power-limited DC signal 24 to one or more LLPDC splitters 14. A LLPDC splitter 14 may generate LLPDC signals 26, 28 for two or more DC powered devices (SSL fixtures 16, 18). In an embodiment the HLPDC source 12 circuit generates Class 1 signals and the LLPDC splitter 14 circuit generates Class 2 signals 26, 28 as defined by the National Electric Code (NEC) Article 725.

As defined by the NEC, Article 725, a Class 1 limited-power source circuit is limited to 30 volts and 1,000 volt-amperes and a Class 2 limited-power source circuit is limited to 30 volts, 100 volt-amperes, and 8 amperes. It is noted that Class 2 circuits are not considered a danger to personnel and may not require an electrician to install wiring between Class 2 limited-power source circuit and a device, e.g., between a LLPDC splitter 14 and a DC powered device 16, 18.

The HLPDC source 12 may be at large distance from the LLPDC splitter 14, in an embodiment up to a first maximum predetermined distance apart. Similarly a SSL fixture 16, 18 may be located at large distance from the LLPDC splitter 14, in an embodiment up to a second, shorter maximum predetermined distance apart. Accordingly a LLPDC splitter 14 may be located at a central location relative to the two or more fixtures 16, 18 and the HLPDC source 12.

Figure 2B:
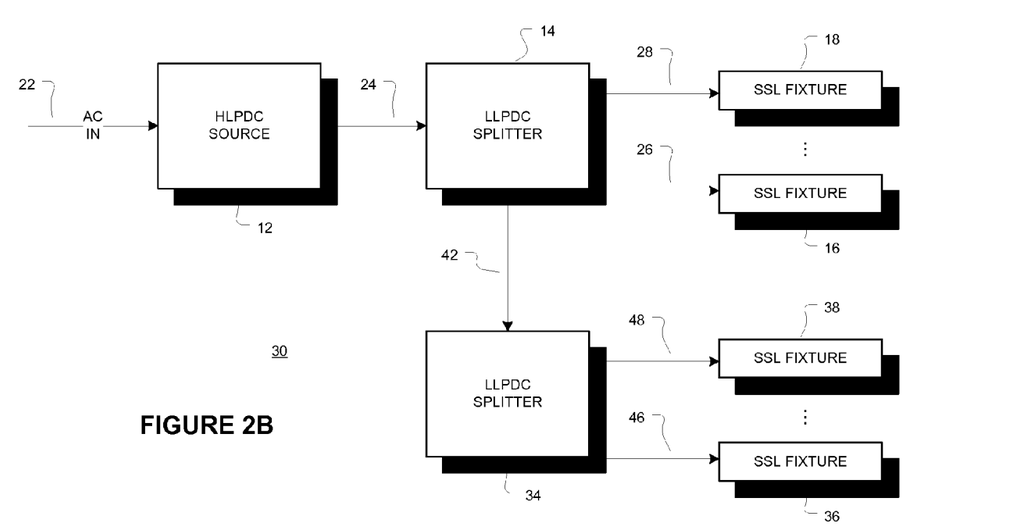
FIG. 2B is a block diagram of another power distribution architecture according to various embodiments.

The HLPDC source 12 and the LLPDC splitter 14 may also conform to other standards. In an embodiment the HLPDC source 12 maximum volt-amperes output level may be at least twice the LLPDC splitter 14 maximum volt-amperes output level. FIG. 2B is a block diagram of another power distribution architecture 30 according to various embodiments. The architecture 30 includes a HLPDC source 12, a first LLPDC splitter 14 coupled to at least two fixtures 16, 18, and a second LLPDC splitter 34 coupled to at least two fixtures 36, 38. In this embodiment the first LLPDC splitter 14 input is coupled to the second LLPDC splitter 34. The HLPDC source 12 may provide power to the first and the second LLPDC splitter 14, 34.

Figure 2C:
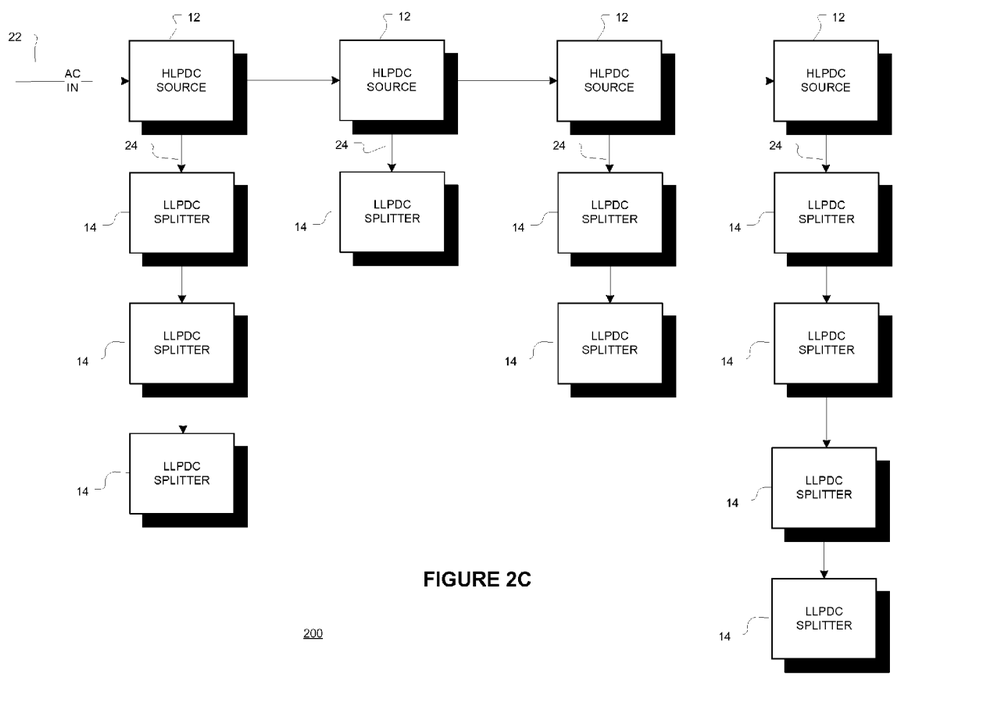
FIG. 2C is a block diagram of a multiple HLPDC source distribution architecture according to various embodiments.

FIG. 2C is a block diagram of a power distribution architecture 200 according to various embodiments. In architecture 200 a HLPDC source 12 may include a pass through port for an input signal. In architecture 200 several HLPDC sources 12 are employed to provide a power-limited DC signal to several LLPDC splitters 14. As shown in FIG. 2C, four (4) HLPDC sources 12 are coupled to an AC source. Each HLPDC source 12 is coupled to one or more LLPDC splitters 14. In architecture 200 a HLPDC source 14 is coupled to three (3), one (1), two (2), and four (4) LLPDC splitters 14, respectively. Each LLPDC splitter 14 may be coupled to DC powered devices.

Figure 3:
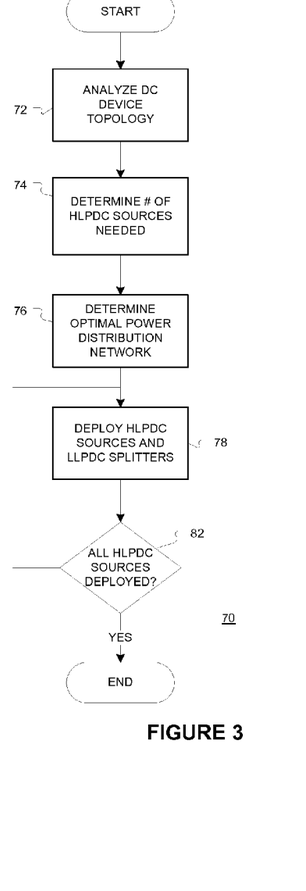
FIG. 3 is a flow diagram illustrating several methods according to various embodiments.

The present invention may be used to employ power distribution networks including at least one LLPDC splitter 14. In such an embodiment a LLPDC splitter 14 may accept an AC or DC power source signal and convert the signal to LLPDC signals for two or more DC powered devices including SSL fixtures. FIG. 3 is a flow diagram illustrating several methods 70 according to various embodiments. In order to determine the optimal or required distribution of HLPDC sources 12 and LLPDC splitters 14, the method 70 may analyze the desired or existing DC powered device topology in a structure, facility, or location (activity 72).

The method may first determine the number of HLPDC sources 12 required to support the desired or existing DC powered devices (activity 74). The method may determine the total, maximum power requirement for the DC powered devices and then determine the integer number of HLPDC sources needed to support the maximum power requirement based on the HLPDC source's 12 maximum power output. The method 70 may also determine the maximum or furthest distance permitted between a HLPDC source and one or more LLPDC splitters 14 (may be a function of local or national electrical codes). In such an embodiment additional HLPDC sources 12 may be required as a function of the distance between the DC powered devices 16, 18 to be powered.

The method 70 may then determine the optimal power distribution network configuration or topology (activity 76). The location(s) of the required HLPDC sources may be determined as a function of the DC powered devices 14, 16 distribution and distance between the ultimate HLPDC source(s) 12, LLPDC splitters 14, and DC powered devices 16, 18. In an embodiment the HLPDC sources 12 may be located in a central or secure location for safety, security, and local and national electrical code requirements. The method 70 may then deploy the HLPDC source(s) and related LLPDC splitters 14 (activity 78 and 82) until all the HLPDC sources have been deployed.

Figure 4:
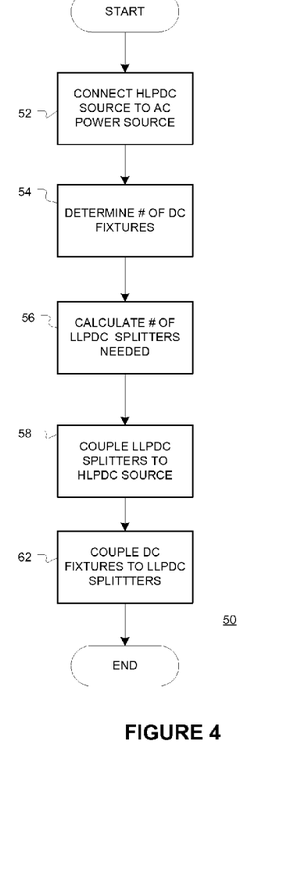
FIG. 4 is a flow diagram illustrating several methods according to various embodiments.

In some configurations such as for a residential, small business, or small outdoor systems, only a single HLPDC source may be required. FIG. 4 is a flow diagram illustrating several methods 50 according to various embodiments for powering DC powered devices in a single HLPDC source topology. The method 50 may also be used to configure HLPDC sources that are considered part of a discrete system or topology. The method 50 may couple a HLPDC source 12 to an AC power source (activity 52). The method 50 may then determine the number of DC powered devices in the system topology (activity 54).

The method 50 may determine the total, maximum power requirement for the DC powered devices and then determine the integer number of LLPDC splitters needed to support the maximum power requirement based on the LLPDC splitter's 14 maximum power output (activity 56). The method 50 may also determine the maximum or furthest distance permitted between a LLPDC splitter 14 and a respective or perspective DC powered device 16, 18, 36, 38 where the maximum distance may be determined as a function of local or national electrical codes and economical considerations. In such an embodiment additional LLPDC splitters 14 may be required as a function of the distance between the related or perspective DC powered devices 16, 18, 36, 38 to be powered by a LLPDC splitter.

The distance between each LLPDC splitter 14 and the HLPDC source 12 may also be a factor in the LLPDC splitter 14 number calculation. The method 50 may determine the maximum or furthest distance permitted between the HLPDC source 12 and each LLPDC splitter 14 and require one or more additional LLPDC splitters 14 as function of the determined distance (based on local or national electrical codes, economical, wiring, or site topology). The method 50 may then couple the LLPDC splitters 14 to the HLPDC source 12 as a function of the determined number of LLPDC splitters, their respective distance from each other and to the perspective DC powered devices for the LLPDC splitter 14 (activity 58). The method 50 may then couple the LLPDC splitter 14 to the perspective DC powered devices (activity 62).

Figure 5A:
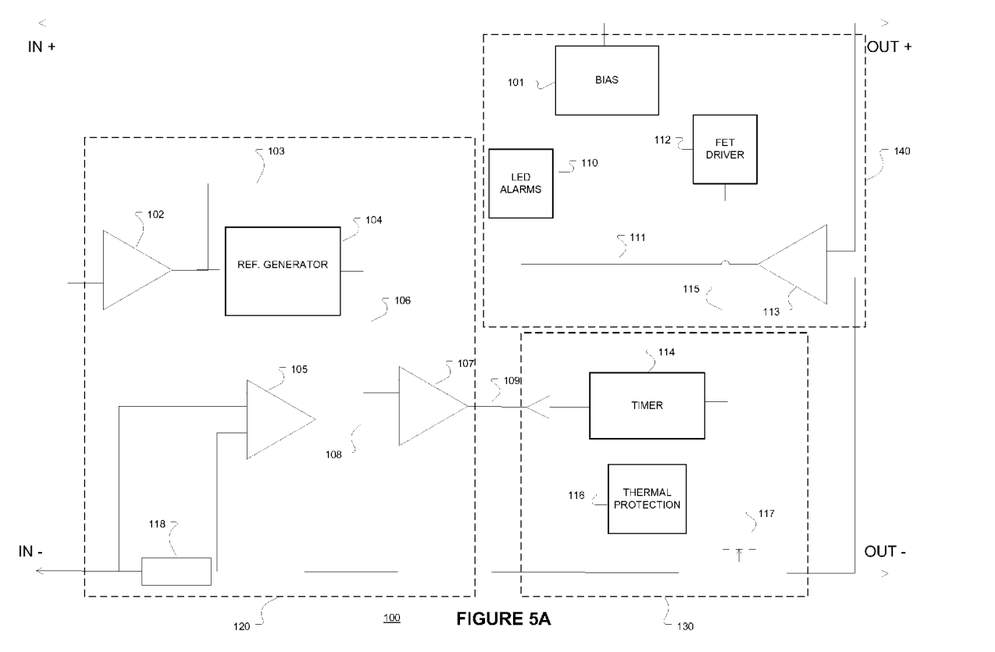
FIG. 5A is a block diagram of a LLPDC splitter according to various embodiments.

FIG. 5A is a block diagram of a LLPDC splitter 100 according to various embodiments. The splitter 100 includes a bias 101, an input voltage amplifier 102, a reference generator 104, a current sense amplifier 105, a current limit amplifier 107, an LED alarm block 110, a field-effect transistor (FET) driver 112, an output voltage amplifier 113, a timer 114, a thermal protection device 116, a metal-oxide-semiconductor field-effect transistor (MOSFET) Q1 (n-type) 117, and a resistor 118. In an embodiment the input voltage amplifier 102, the reference generator 104, the current sense amplifier 105, the current limit amplifier 107, and the resistor 118 comprise a power control module 120. The bias 101, LED alarm block 110, FET driver 112, and output voltage amplifier 113 comprise an ancillary module 140. The timer 114, the thermal protection device 116, and the MOSFET Q 117 comprise a reference controlled output generation module 130.

In operation the power control module 120 may receive an input signal and generate a reference signal 109. The ancillary module 140 generates a voltage reference signal 115 based on a bias signal and generates LED alarms and status. The reference controlled output generation module 130 receives the reference signal 109 and the voltage reference signal 115 to generate a power limited output signal across the output terminals OUT+, OUT−. In an embodiment the reference signal 109 is modulated to limit the output signal power based on one or more electrical regulatory standards.

In an embodiment an input voltage across terminals IN+, IN− is sensed by the input voltage amplifier 102. The input voltage amplifier generates a reference voltage 103. The reference generator 104 receives the reference voltage 103, determines the input voltage range, and sets a reference voltage signal 106 for the current limit amplifier 107. In an embodiment the reference voltage 106 is set to one of two values as a function of the sensed voltage (as described below) based on the power limitations set for the lower-limited-power DC splitter 100.

As noted above, a LLPDC splitter 14 may have a limited power output based on one or more standards established by one or more electrical regulatory groups including the NEC. In an embodiment, the splitter 100 may be configured to meet the NEC requirements for a Class 2 circuit where: a) for output voltages up to 20V, the maximum current is be limited to 5 A (100 Watt maximum for 20V output signal) and b) for output voltages between 20V and 60V, the maximum power is limited to 100 W. Accordingly, in an embodiment an output signal at 12V, has a 5 A current and power limitation of 60 W and an output signal at 24V has a power limitation of 100 W (and current effectively 4.15 A.)

In another embodiment the reference voltage 106 is set to a range of values based on the measured voltage and one or more electrical codes or desired maximum power or current. For a device having a Class 2 circuit the ampere is limited to 5 for voltages up to 20 volts and the power is limited to 100 watts for voltages greater than 20 volts. Accordingly, the reference voltage 106 may be linearly related to the measured voltage where the maximum power is limited to the measured voltage times 5 amperes for measured voltages less than 20 volts. Otherwise the reference voltage 106 may be linearly related to a maximum power (100 watts in an embodiment) divided the measured voltage value.

In an embodiment the current passing through the LLPDC splitter 100 may be determined by measuring voltage across a resistor 118. The current sense amplifier 105 amplifies the voltage across the resistor 118 which is linearly related to the LLPDC splitter 100 output current. The current sense amplifier signal 108 (linearly related to the splitter 100 output current) is one of two inputs to the current limit amplifier 107. The reference generator 104 provides the other input signal 106. The current limit amplifier 107 effectively compares the voltage reference signal 106 to the current sense amplifier 105 output reference 108 to generate an output level control signal 109.

The timer 114 receives the control signal 109 and may set a timer when the signal 108 is greater than the signal 106, which may indicate that the effective splitter 100 power output level exceeds a desired maximum (such as that set by an electric regulatory code). The timer 114 may also effectively reduce the output signal level of the output generation module 130. The timer 114 may reduce the output signal level by reducing the gate voltage 115 of the MOSFET, Q1 117.

In an embodiment when the timer 114 detects a power overload (beyond desired limits) exists for more than a predetermined time interval (250 ms in one embodiment), the timer 114 may effectively turn off the output signal or power by removing the gate voltage to the MOSFET Q1 (117). The timer 114 may after a second predetermined interval (15 seconds in an embodiment), allow a power generation signal to the gate via line 115. The timer 114 may turn off the output signal 115 again if an overload is detected after the reset. The thermal protection block 116 may generate a voltage that is related to the MOSFET Q1 117 operating temperature. In an embodiment the timer 114 may reduce the power level output or turn off the output for a predetermined time interval as a function of the measured temperature (as indicated by the thermal protection device 116 signal.)

As noted above the ancillary module 140 may include the bias 101, the LED alarm block 110, the FET driver 112, and the output voltage amplifier 113. The bias block 101 may produce a low voltage level signal for use by the FET driver 112. As known to one skilled in the art the FET driver 112 may provide an appropriate drive voltage to the MOSFET, Q1 117. The LED alarm block 110 may monitor the reference signal 103 generated by the input voltage amplifier and a reference signal 111 generated by the output voltage amplifier and determine when the splitter 100 output voltage is within or outside predetermined limits. One or more LEDs may illuminate to show the status of the output voltage.

Any of the components previously described can be implemented in a number of ways, including embodiments in software. Thus, the HLPDC source 12, LLPDC splitter 14, 34, SSL fixtures 14, 16, 36, 38, power control module 120, reference controlled output generator module 130, ancillary module 140, the bias 101, the input voltage amplifier 102, the reference generator 104, the current sense amplifier 105, the current limit amplifier 107, the LED alarm block 110, the field-effect transistor (FET) driver 112, the output voltage amplifier 113, the timer 114, the thermal protection device 116, the metal-oxide-semiconductor field-effect transistor (MOSFET) Q1 (n-type) 117, and the resistor 118 may be characterized as "modules" herein.

Figure 5B:
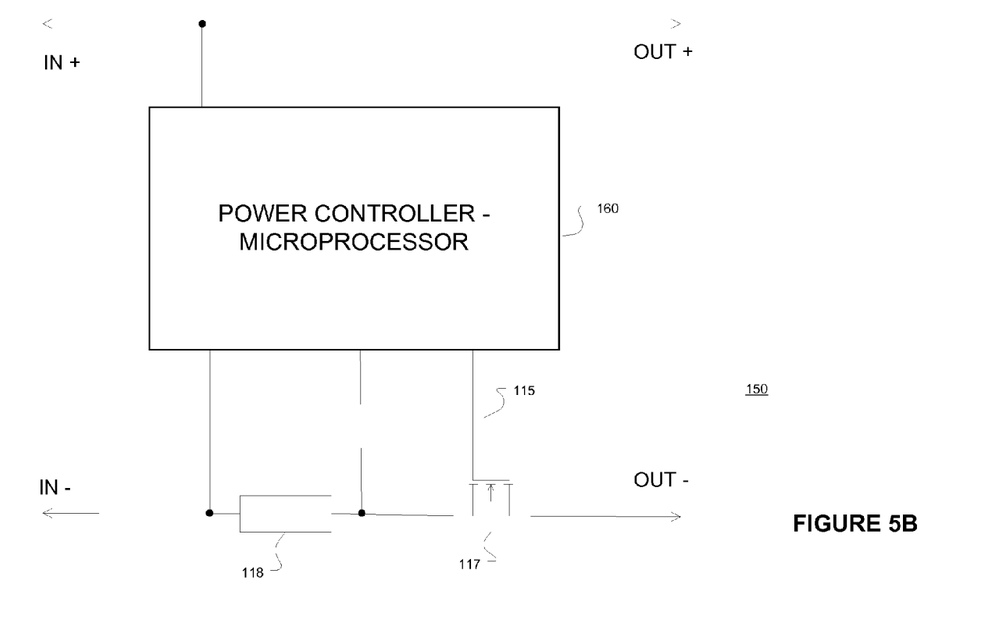
FIG. 5B is a block diagram of another LLPDC splitter according to various embodiments.

The modules may include hardware circuits, single- or multi-processor circuits, memory circuits, software program modules and objects, firmware, and combinations thereof, as desired by the architect of the HPLDC source 12, LLPDC 14, 34 and as appropriate for particular implementations of various embodiments. For example, in an embodiment of a LLPDC splitter 150 may include a power controller microprocessor 160. The microprocessor 160 may measure the voltage across the resistor 118, monitor the voltage across the LLPDC splitter 150, and control the MOSFET 117 gate voltage 115 to regulate the LLPDC splitter 150 power level as explained above.

The apparatus and systems of various embodiments may be useful in applications other than generating DC signals. They are not intended to serve as a complete description of all the elements and features of apparatus and systems that might make use of the structures described herein.

It may be possible to execute the activities described herein in an order other than the order described. Various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 6 below.

Figure 6:
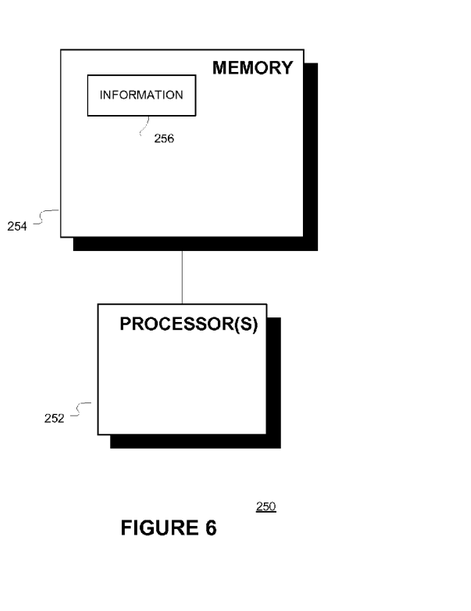
FIG. 6 is a block diagram of an article according to various embodiments.

FIG. 6 is a block diagram of an article 250 according to various embodiments of the invention. Examples of such embodiments may comprise a computer, a memory system, a magnetic or optical disk, some other storage device, or any type of electronic device or system. The article 250 may include one or more processor(s) 252 coupled to a machine-accessible medium such as a memory 254 (e.g., a memory including electrical, optical, or electromagnetic elements). The medium may contain associated information 256 (e.g., computer program instructions, data, or both) which, when accessed, results in a machine (e.g., the processor(s) 252) performing the activities previously described.

Although the inventive concept may include embodiments described in the exemplary context of one or more electrical standards, the claims are not so limited. Additional information regarding the NEC standards and other electrical standards may be found in common literature available to one of skill in the art.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A direct current (DC) splitting module to provide a DC signal to a plurality of DC powered devices, including:
   a power control module to receive an input DC signal and to determine the voltage level of the input DC power signal; and
   a reference controlled output generator module to generate controlled DC signal with a fixed output voltage level where the output voltage level varies as a function of the input DC signal voltage level, to limit the DC signal to a predetermined maximum one of a power and a current level as a function of the input DC signal voltage level, and to provide the controlled DC signal to the plurality of DC powered devices wherein the power control module generates a control signal representing a differential between the predetermined maximum and the determined one of the power and the current level of the controlled DC signal wherein the reference controlled output generator module reduces one of the power and the current level of the controlled DC signal as a function of the control signal.

2. The DC splitting module of claim 1, wherein the power control module determines one of the power and the current level of the controlled DC signal.

3. The DC splitting module of claim 1, wherein the reference controlled output generator module reduces one of the power and the current level of the controlled DC signal to about zero as a function of the control signal.

4. The DC limited power splitting module of claim 1, wherein the reference controlled output generator module reduces one of the power and the current level of the controlled DC signal to about zero as a function of the control signal and time.

5. A system, including:
   a direct current (DC) high power module to generate a high power DC signal;
   a direct current (DC) low power splitting module physically separate and electrically coupled to the DC high power module to receive the high power DC signal to generate a low power DC signal with a fixed output voltage level and a variable current level to a plurality of DC powered devices, the high power DC signal having a power greater than the low power DC signal, including:
   a power control module to receive the high power DC signal and to determine the voltage level of the high power DC signal; and
   a reference controlled output generator module to generate the low power DC signal with a fixed output voltage level where the output voltage level varies as a function of the high power DC signal voltage level, to limit the low power DC signal to a predetermined maximum one of a power and a current level as a function of the high power DC signal voltage level, and to provide the limited low power DC signal to a plurality of DC powered devices wherein the power control module generates a control signal representing a differential between the predetermined maximum and the determined one of the power and the current level of the controlled DC signal wherein the reference controlled output generator module reduces one of the power and the current level of the controlled DC signal as a function of the control signal.

6. The system of claim 5, wherein the power control module determines one of the power and the current level of the low power DC signal.

7. The system of claim 5, wherein the reference controlled output generator module reduces one of the power and the current level of the low power DC signal to about zero as a function of the control signal.

8. The system of claim 5, wherein the plurality of DC powered devices are physically separate from the DC low power splitting module by at least a first predetermined distance and the DC low power splitting module is physically separate from the DC high power module by at least a second predetermined distance, the second predetermined distance greater than the first predetermined distance.

9. A method, including:
   at a power control module, receiving an input DC signal and to determining the voltage level of the input DC power signal; and
   at a reference controlled output generator module, generating a controlled DC signal with a fixed output voltage level where the output voltage level varies as a function of the input DC signal voltage level, limiting the controlled DC signal to a predetermined maximum one of a power and a current level as a function of the input DC signal voltage level, and providing controlled DC signal to a plurality of DC powered devices further including at the power control module generating a control signal representing a differential between the predetermined maximum and the determined one of the power and the current level of the controlled DC signal further including at the reference controlled output generator module reducing one of the power and the current level of the controlled DC signal as a function of the control signal.

10. The method of claim 9, further including at the reference controlled output generator module significantly reducing one of the power and the current level of the controlled DC signal to about zero as a function of the control signal.

11. An article including a machine-accessible medium having associated information, wherein the information, when accessed, results in a machine performing:
   at a power control module, receiving an input DC signal and determining the voltage level of the input DC power signal; and
   at a reference controlled output generator module, generating a controlled DC signal with a fixed output voltage level where the output voltage level varies as a function of the input DC signal voltage level, limiting the controlled DC signal to a predetermined maximum one of a power and a current level as a function of the input DC signal voltage level, and providing the controlled DC signal to a plurality of DC powered devices wherein the information, when accessed, results in a machine performing at the power control module generating a control signal representing a differential between the predetermined maximum and the determined one of the power and the current level of the controlled DC signal the information, wherein the information when accessed, results in a machine performing at the reference controlled output generator module reducing one of the power and the current level of the controlled DC signal as a function of the control signal.

12. A system, including:
a direct current (DC) high power module to generate a high power DC signal having a fixed voltage level;
a plurality of DC low power splitter modules physically separate and electrically coupled to the DC high power module, each DC low power splitter module generating a low power limited, fixed voltage DC signal for a plurality of DC powered devices, wherein each DC low power splitting modules receives the high power DC signal and the fixed voltage level is determined as a function of the DC high power signal fixed voltage level each of the plurality of DC low power splitter modules includes: a power control module to receive the high power DC signal and to determine the voltage level of the high power DC signal; and a reference controlled output generator module to generate the low power DC signal with a fixed output voltage level where the output voltage level varies as a function of the high power DC signal voltage level, to limit the low power DC signal to a predetermined maximum one of a power and a current level as a function of the high power DC signal voltage level, and to provide the limited low power DC signal to a plurality of DC powered devices wherein the power control module generates a control signal representing a differential between the predetermined maximum and the determined one of the power and the current level of the controlled DC signal wherein the reference controlled output generator module reduces one of the power and the current level of the controlled DC signal as a function of the control signal.

13. The system of claim 12, wherein the DC high power module further converts an AC signal to the high power DC signal having a fixed voltage level and the plurality of DC powered devices are physically separate from the plurality of DC low power splitter modules by at least a first predetermined distance and the plurality of DC low power splitter modules are physically separate from the DC high power module by at least a second predetermined distance, the second predetermined distance greater than the first predetermined distance.

14. The system of claim 13, wherein the plurality of DC powered devices is coupled to a solid state lighting fixture.

15. The system of claim 13, wherein the plurality of DC powered devices is coupled to at least one light emitting diode.

16. The system of claim 12, wherein the direct current (DC) high power module is couplable to Class 1 circuit and the plurality of DC lower low power splitter modules are couplable to Class 2 circuits based on the National Electric Code.

17. The system of claim 12, wherein the power control module determines one of the power and the current level of the high power DC signal.

18. A method, including:
at direct current (DC) high power module, generating a high power DC signal having a fixed voltage level;
at a plurality of DC low power splitter modules physically separate and electrically coupled to the DC high power module, each DC low power splitter module generating a low power limited, fixed voltage DC signal for a plurality of DC powered devices, wherein each DC low power splitting modules receives the high power DC signal and the fixed voltage level is determined as a function of the DC high power signal fixed voltage level each of the plurality of DC low power splitter modules includes: a power control module to receive the high power DC signal and to determine the voltage level of the high power DC signal; and a reference controlled output generator module to generate the low power DC signal with a fixed output voltage level where the output voltage level varies as a function of the high power DC signal voltage level, to limit the low power DC signal to a predetermined maximum one of a power and a current level as a function of the high power DC signal voltage level, and to provide the limited low power DC signal to a plurality of DC powered devices wherein the power control module generates a control signal representing a differential between the predetermined maximum and the determined one of the power and the current level of the controlled DC signal wherein the reference controlled output generator module reduces one of the power and the current level of the controlled DC signal as a function of the control signal.

19. The method of claim 18, further including at the DC high power module converting an AC signal to the high power DC signal having a fixed voltage level and the plurality of DC powered devices are physically separate from the plurality of DC low power splitter modules by at least a first predetermined distance and the plurality of DC low power splitter modules are physically separate from the DC high power module by at least a second predetermined distance, the second predetermined distance greater than the first predetermined distance.

20. The method of claim 19, wherein each of the plurality of DC powered devices are coupled to a solid state lighting fixture.

21. The method of claim 19, wherein each of the plurality of DC powered devices are coupled to at least one light emitting diode.

22. The method of claim 18, wherein power control module determines one of the power and the current level of the high power DC signal.

* * * * *